United States Patent [19]

Henry

[11] Patent Number: 5,084,999
[45] Date of Patent: Feb. 4, 1992

[54] FISH HOOK REMOVER

[76] Inventor: Harold F. Henry, 1165 Camelot, Pinckney, Mich. 48169

[21] Appl. No.: 564,134

[22] Filed: Aug. 8, 1990

[51] Int. Cl.$^5$ .............................................. A01K 97/00
[52] U.S. Cl. ...................................................... 43/53.5
[58] Field of Search .......................................... 43/53.5

[56] References Cited

U.S. PATENT DOCUMENTS

| D. 183,858 | 11/1958 | Newman | D31/4 |
| D. 247,971 | 5/1978 | Turner | D22/31 |
| D. 291,228 | 8/1987 | Krueger | D22/149 |
| 1,000,775 | 8/1911 | Buras | 43/53.5 |
| 2,164,907 | 7/1939 | Falkner | 43/29 |
| 2,492,799 | 12/1949 | Holland | 43/29 |
| 2,493,142 | 1/1950 | Hutton | 43/53.5 |
| 2,586,431 | 2/1952 | Krichbaum | 43/53.5 |
| 3,115,722 | 12/1963 | Mann | 43/21.2 |
| 3,835,574 | 9/1974 | Harwood | 43/53.5 |

Primary Examiner—Kurt Rowan
Attorney, Agent, or Firm—James M. Deimen

[57] ABSTRACT

A fish hook remover comprises a long slender body with a convenient hand grip at one end and a tapered trough leading to a tip at the other end. The tip end includes a notch at the bottom of the trough with the curving tips to either side of the notch shaped to prevent damage to the mouth and throat flesh of the fish. The tips are doubled curved, each with a substantially semi-circular and semi-elliptical form to prevent the tips from catching on the flesh as the remover is guided down to the hook and the hook is extracted.

3 Claims, 1 Drawing Sheet

FISH HOOK REMOVER

BACKGROUND OF THE INVENTION

The field of the invention pertains to sport and commercial fishing devices and, in particular, to devices to remove fish hooks that have been partially or fully swallowed by fish.

A number of devices have been disclosed for the removal of fish hooks from the mouth and throat of fish. U.S. Pat. No. 2,164,907 discloses a fish hook disgorging device wherein the fishline is used as a guide within a tubular body having a double pointed notch at the tip for receiving the fish hook. U.S. Pat. No. Des. 183,858 also discloses a hook dislodger having a notch between tips, but no means to guide the dislodger down the fishline.

U.S. Pat. No. 2,492,799 discloses a fish hook extractor having a small notch and an external groove to guide the extractor down the fish line to the hook. U.S. Pat. No. 3,115,722 discloses a multi-purpose attachment to a fishing pole. The attachment includes a fish hook extractor as a combined part of the means to engage the pole as a fishing stand. The extractor is a secondary notch within a primary notch that serves as a guide down the fishline to the hook, the primary notch also serving to engage the pole when used as a fishing stand.

U.S. Pat. No. 3,835,574 discloses a double prong fish hook extractor having a magnet adjacent the prongs to engage the fish hook once the fish hook is trapped and dislodged by the prongs. U.S. Pat. No. Des. 247,971 discloses a fish hook removal tool having a notch between sharp prongs at the end thereof and a separate notch formed into the side of the tool just above the notched end. In a similar manner U.S. Pat. No. Des. 291,228 discloses a fish hook extractor having the notch at the tip of a long slender body in turn extending from a relatively large handle.

Although all of the disclosures detail devices that appear capable of assisting in the removal of a fish hook that has been swallowed, there remains a need for a fish hook extractor that does little or no further damage to the fish than has been done by the hook in landing the fish. More specifically, sport fishing in recent years has become increasing more for sport and less to obtain a fresh meal. Moreover, fishermen have recognized the need to return under sized and non-edible fish back to the water alive. Toxic materials in many lakes have also caused large fish that are caught to be returned because of the danger to health if eaten. Therefore, it is now important to extract hooks without further injury to the fish.

SUMMARY OF THE INVENTION

The new fish hook remover comprises a long slender body with a convenient hand grip at one end and a trough leading to a tip at the other end. The tip end includes a notch at the bottom of the trough. The curving tips to either side of the notch are shaped to prevent damage to the soft flesh of the fish throat. Thus, as the fish hook remover is guided down to the curve of the fish hook, the tips gently push aside any flesh encountered without further damage to the fish. The curving tips of applicant's fish hook remover are distinguished from the sharp and pointed tips of the prior art which lacerate and rip flesh encountered in extracting the fish hook.

DESCRIPTION OF THE PREFERRED EMBODIMENT

Figure 1:
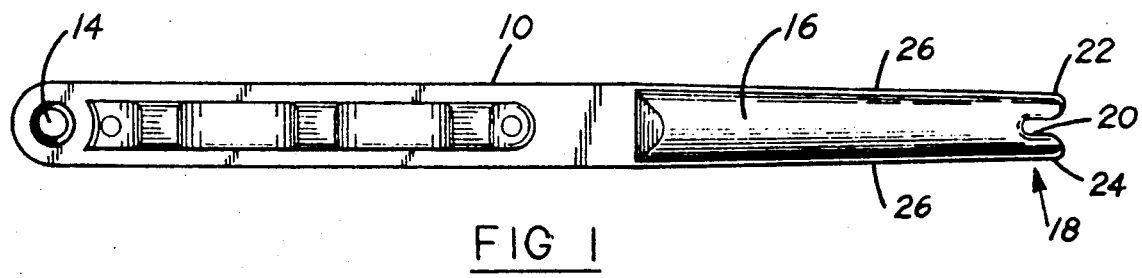
FIG. 1 illustrates the new fish hook remover in plan view.
Figure 2:
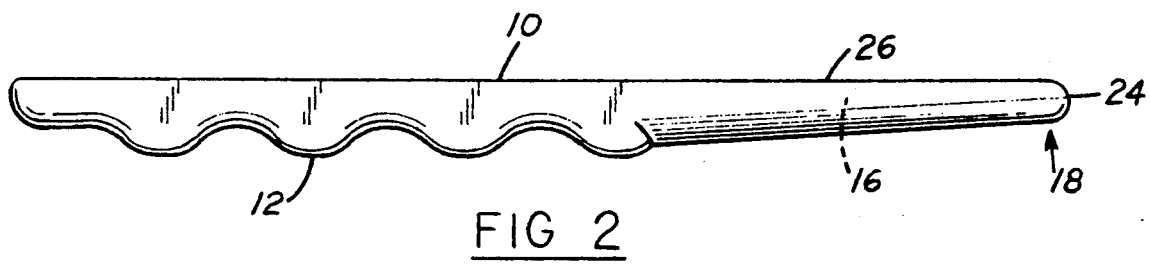
FIG. 2 illustrates the new remover in side view.

As shown in the figures, the fish hook remover comprises a long slender body 10 having a convenient hand grip 12 and a hole 14 to attach to a line or small chain. Beyond the hand grip 12 portion of the body 10 is a tapered trough 16 formed in the body and leading to the tip end generally denoted by 18. The tip end 18 is formed with a notch 20 centered in the trough 16.

Figure 3:
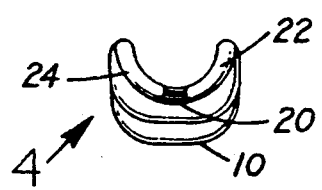
FIG. 3 illustrates the tip end view of the remover.
Figure 4:
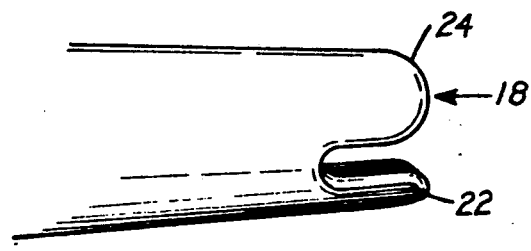
FIG. 4 is a view of the tip end of the remover taken in the direction of arrow 4 in FIG. 3.

To each side of the trough 16 are a pair of curving tips 22 and 24. The tips are smoothly curving from the notch up and around the trough 16 to the top edges 26 of the trough. The trough 16 and outside of the body 10 at the tip end 18 are substantially semi-circular in cross-section as shown in FIG. 3. Each tip 22 and 24 is also substantially half elliptical as best shown in FIG. 4. The double smooth curvature prevents the tips 22 and 24 from catching on the mouth and throat flesh of the fish. Rather, the tips push aside the flesh without lacerating or penetrating the flesh.

In use the new fish hook remover is guided into the mouth and throat of the fish and the notch 20 is engaged with the curving portion of the fish hook to extract the fish hook. The smoothly curving tips prevent catching of the remover on the adjacent flesh as the hook is extracted. The only additional damage that may occur is caused by the barb on the hook as the hook is extracted.

I claim:

1. A fish hook remover comprising a long slender body having a hand grip formed on the bottom of the body and a tapered substantially semi-circular open top trough extending to a tip end, a notch at the tip end on the bottom of the body, said notch at the bottom of the trough opposite the open top and spacing apart a pair of tips, said pair of tips together curved in cross-section perpendicular to the length of the body by the substantially half-circular form of the trough at the tip end and each tip separately substantially half elliptically curved in a direction perpendicular to the cross-section and extending between the notch and the corresponding top edge of the open top trough to thereby form a smooth blunt curve from the notch to the top edge.

2. The fish hook remover of claim 1 wherein the body exterior is substantially semi-circular in cross-section beneath the trough.

3. A fish hook remover comprising a long slender body having a tip end, an open top trough formed in the tip end and a notch at the tip end on the bottom of the body, said notch at the bottom of the trough opposite the open top to form a pair of tips, said pair of tips together curved in cross-section perpendicular to the length of the body by the curve of the trough in cross-section and each tip separately substantially half elliptically curved in a direction perpendicular to the cross-section and extending between the notch and the corresponding top edge of the open top trough to thereby form a smooth blunt curve from the notch to the top edge.

* * * * *